(No Model.)

R. L. STICKNEY.
GUARD OR SHIELD FOR PROJECTING SURFACES.

No. 398,909. Patented Mar. 5, 1889.

Witnesses.
John F. C. Premitark.
Frederick L. Emery.

Inventor.
Randolph L. Stickney,
by Crosby & Gregory Attys.

UNITED STATES PATENT OFFICE.

RANDOLPH L. STICKNEY, OF PEABODY, ASSIGNOR OF ONE-HALF TO KING UPTON, OF SALEM, MASSACHUSETTS.

GUARD OR SHIELD FOR PROJECTING SURFACES.

SPECIFICATION forming part of Letters Patent No. 398,909, dated March 5, 1889.

Application filed November 10, 1888. Serial No. 290,499. (No model.)

*To all whom it may concern:*

Be it known that I, RANDOLPH L. STICKNEY, of Peabody, county of Essex, State of Massachusetts, have invented an Improvement in Guards or Shields for Projecting Surfaces, of which the following description, in connection with the accompanying drawings, is a specification, like letters on the drawings representing like parts.

Pulleys, collars, shaft-couplings, and the like are commonly secured to a shaft by means of machine or set screws, and in practice the protruding heads of said screws have been the cause of many accidents by catching objects that are moved or approach too near.

This invention has for its object to provide a guard or shield for said protruding heads or ends of the screws, whereby a smooth or uninterrupted surface is presented.

This invention consists in the combination, with the protruding head or end of the screw, of a guard or shield therefor.

In carrying out this invention a piece or strip of metal may inclose the protruding head or end of the screw, or a piece or block of metal or other material may be employed, it being hollowed out or recessed to receive the head or end of the screw.

Figure 1:
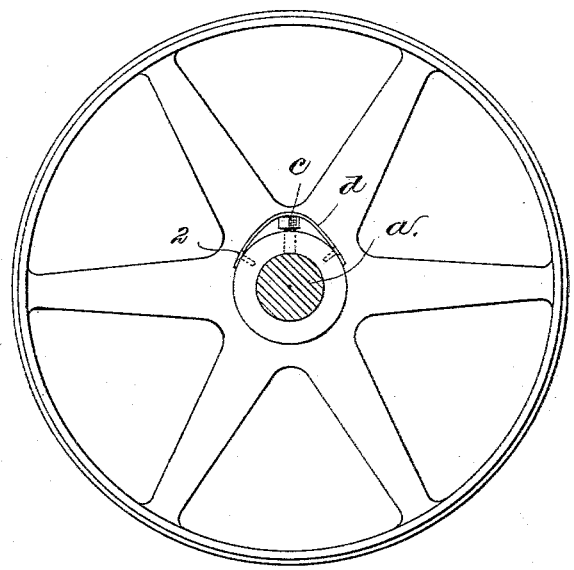
Figure 2:
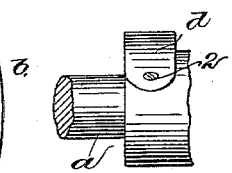
Figure 3:
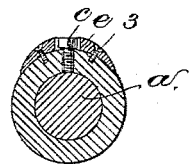
Figure 4:
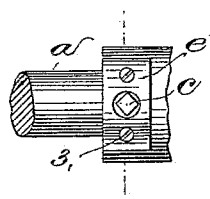
Figure 5:
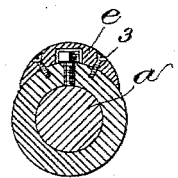

Figure 1 shows in side view a pulley having a set-screw inclosed by a guard or shield embodying this invention; Fig. 2, a front elevation of a part of the shaft and hub of the pulley shown in Fig. 1; Fig. 3, a cross-section of the shaft, hub, and screw, having a modified form of guard or shield; Fig. 4, a plan view of the form shown in Fig. 3; Fig. 5, a cross-section of the shaft, hub, and screw, and a modified form of guard or shield; and Fig. 6, a plan view of the form shown in Fig. 5.

Figure 6:
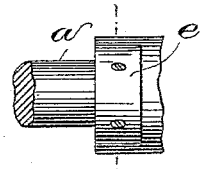

The shaft $a$ is herein shown as having thereon a pulley, $b$, a set-screw, $c$, passing through the hub of said pulley to secure it to the shaft $a$. The head or end of the set-screw projects, and in practice strikes and catches objects as it is revolved. A guard or shield (shown in Figs. 1 and 2 as a strip of metal, $d$) is bent down over the said projecting head or end, the ends of said strip being secured to the hub, as by the screws 2. In Figs. 3 and 4 the guard or shield is made as a block or piece of metal, $e$, curved to conform to the curvature of the hub, said block or piece having a hole formed through it to receive the head or end of the screw $c$. This block or piece is secured by screws 3. In Figs. 5 and 6 the block or piece $e$ is made somewhat thicker, and the hole, instead of being formed through the block or piece, is only formed partially through it.

By the construction shown a smooth-surfaced guard or shield is provided, which is inexpensive, and which may be readily applied to the hub of a pulley or to any other object secured to the shaft.

I claim—

1. The combination of a shaft, a hub or collar thereon, and a set-screw securing the same to the shaft and projecting from its face, with a guard or shield for the projecting head or end, said guard consisting of a metallic strip bent over upon said head or end and attached at its ends to the said hub or collar, substantially as and for the purpose described.

2. The combination of a shaft, a hub or collar thereon, and a set-screw securing the same to the shaft and projecting from its face, with a guard or shield for the projecting head or end, said guard consisting of a curved strip having an opening therein to receive the screw-head and attached at its ends to the said hub or collar, substantially as and for the purpose described.

In testimony whereof I have signed my name to this specification in the presence of two subscribing witnesses.

RANDOLPH L. STICKNEY.

Witnesses:
GEO. R. UNDERWOOD,
HENRY WARDWELL.